(12) United States Patent
Vogel

(10) Patent No.: US 6,912,217 B1
(45) Date of Patent: Jun. 28, 2005

(54) PROTOCOL STACK ENCAPSULATION FOR VOICE PROCESSOR

(75) Inventor: Danny C. Vogel, Sudbury, MA (US)

(73) Assignee: LSI Logic Corporation, Milpitas, CA (US)

( * ) Notice: Subject to any disclaimer, the term of this patent is extended or adjusted under 35 U.S.C. 154(b) by 834 days.

(21) Appl. No.: 09/918,736

(22) Filed: Jul. 31, 2001

(51) Int. Cl.$^7$ .......................... H04L 12/28; H04J 3/16; G06F 13/28; G06F 15/16

(52) U.S. Cl. ........................ 370/389; 370/465; 710/23; 709/212

(58) Field of Search ................................ 370/351, 352, 370/389, 465, 466; 709/212–214, 245; 710/22–23, 52, 30, 33, 34

(56) References Cited

U.S. PATENT DOCUMENTS

| 5,502,838 | A | | 3/1996 | Kikinis | |
|---|---|---|---|---|---|
| 5,970,069 | A | * | 10/1999 | Kumar et al. | 370/466 |
| 6,092,116 | A | * | 7/2000 | Earnest et al. | 710/23 |
| 6,622,183 | B1 | * | 9/2003 | Holm | 710/33 |

* cited by examiner

Primary Examiner—Duc Ho
Assistant Examiner—Phuongchau Ba Nguyen
(74) Attorney, Agent, or Firm—Conley, Rose & Tayon (57) ABSTRACT

A system and method are presented for the encapsulation of a protocol stack in a voice telephony processor. Utilizing the system and method disclosed herein, digital voice telephony signals received in TDM frame-based format are converted to packet-based or cell-based format for transmission on a network, and vice-versa. The system and method may be embodied as a functional block within a specialized high-density integrated circuit voice processor. The voice processor employs on-chip digital signal processors (DSPs) to perform echo cancellation, dynamic range compression/ expansion, and other processing on voice data. Advantageously, the encapsulation process of the disclosed herein does not impact the throughput of the DSPs. Instead, voice data is reformatted and prefixed with a header for the appropriate protocol layers using a dedicated on-chip packet control processor and linked list data structures managed by indexed direct memory access (DMA) controllers. Thus, data encapsulation has no impact on the signal processing activities.

16 Claims, 5 Drawing Sheets

PROTOCOL STACK ENCAPSULATION FOR VOICE PROCESSOR

RELATED APPLICATIONS

This application is related to the following copending U.S. patent applications, filed on even date herewith: "Efficient High Density Voice Processor" and "Voice Processor with Memory Adaptable for Minimum Power Consumption" by Dan C. Vogel.

BACKGROUND OF THE INVENTION

1. Field of Invention

This invention relates to integrated circuits (ICs) for voice communications, and more particularly, to a highly integrated processor for processing and routing voice traffic conforming to various standard protocols over a digital network. As disclosed herein, special memory management hardware associated with the processor efficiently implements protocol encapsulation, with minimal intervention on the part of the processor.

2. Description of Related Art

In its early history, voice communications consisted of analog signals transmitted over comparatively short distances. As telephone use increased and long distance connections became commonplace, it was necessary to find a way to transmit multiple voice signals over a common line. A communications network in which every 2-way conversation is allotted its own line works well enough for a small number of users, separated by short distances. But as the number of users increases, the amount of material and labor required to install and maintain a dedicated line for each user quickly becomes prohibitive. The alternative was to transform voice signals into digital form and combine their digital representations using a technique known as time division multiplexing (TDM).

Figure 1:
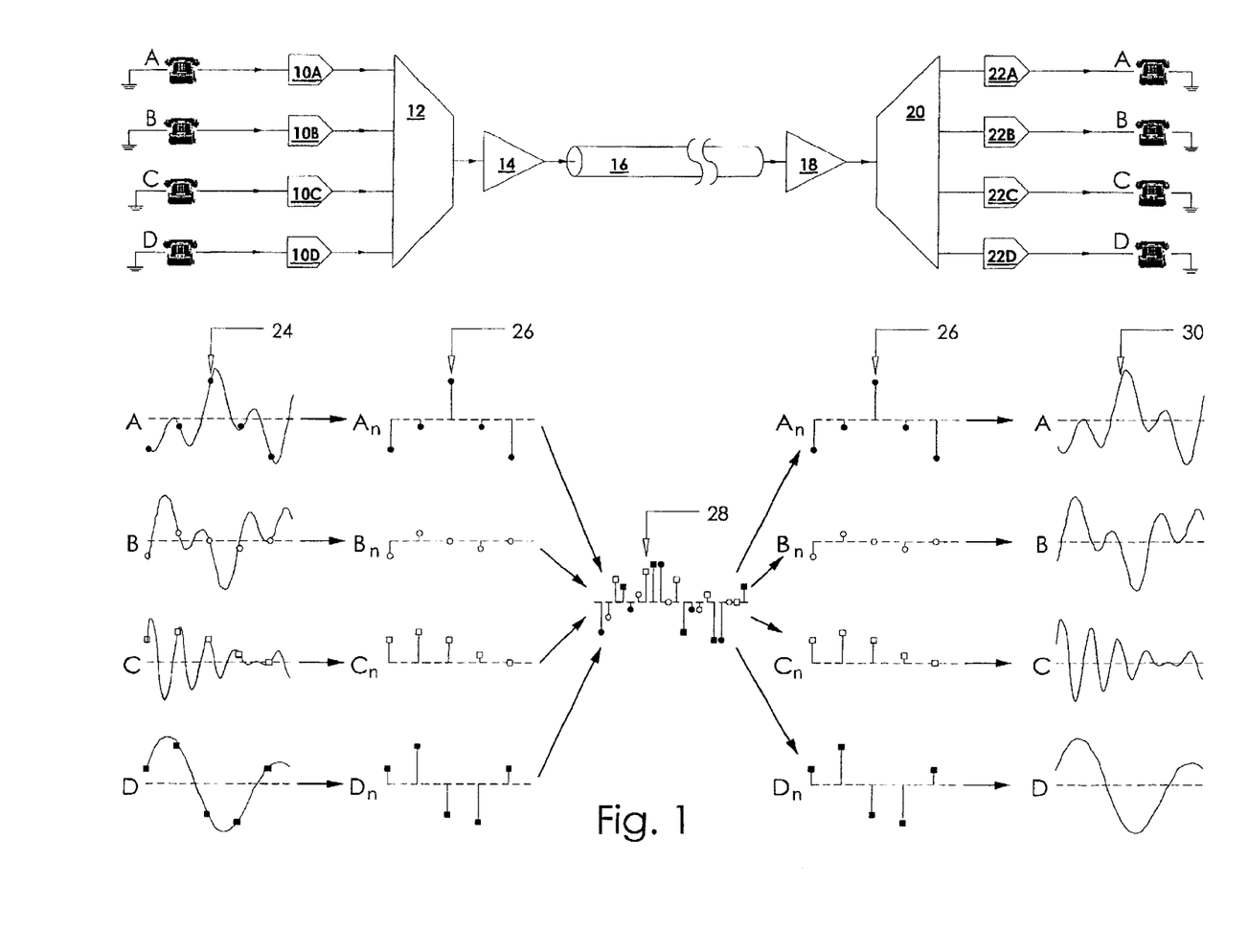
FIG. 1 illustrates the use of time division multiplexing (TDM) to transmit multiple voice channels using a single line.

A simple example illustrating the technique of time division multiplexing (TDM) is presented in FIG. 1. In this example, four different voice signals from sources A–D are to be transmitted across a single wire to a remote destination. In the first stage 24 of this process, the voice signals are digitized by analog-to-digital (A/D) converters 10A–D. In other words, each of the continuous signals A–D is periodically sampled and represented by a binary number denoting the approximate voltage of the sample. In FIG. 1, the samples for waveform A are represented by solid circles, while those for waveforms B, C and D are represented by hollow circles, hollow squares and solid squares, respectively. The individual samples in each sequence may be denoted by the letter associated with the source, with a subscript for the sample number. For example, the samples in the sequence derived from source B would be denoted $B_0$, $B_1 \ldots B_n$.

The resulting sample sequences 26 must contain sufficient information to reconstruct the original waveforms at the destination. According to the Nyquist Theorem, this requires that each waveform be sampled at a rate greater than twice the highest frequency present in the waveform. For example, a signal containing frequencies of up to 1 KHz must be sampled at a rate greater than 2 KHz, to permit the signal to be reconstructed from its discrete samples. In the case of standard voice communications, signals are assumed to be band-limited to about 3 KHz, so a sampling rate of 8 KHz is used. This implies that the sample interval (i.e., the time interval between any two adjacent samples) in the sequences 26 is 125 $\mu$s.

A multiplexer 12 combines the four sample sequences 26 into a multiplexed sequence 26. Two characteristics of this multiplexed sequence are particularly noteworthy: In the first place, the original four sample sequences are interleaved to create the multiplexed sequence. Thus, the sample order in the multiplexed sequence is:

$$A0, B0, C0, D0, A1, B1, C_1, D_1, \ldots, A_n, B_n, C_n, D_n$$

Note that this preserves the original order of the samples. In the second place, the effective sample rate in the multiplexed sequence is four times that of the original sequences. Within each 125 $\mu$s sample interval, the multiplexer 12 must collect a new sample from each of the four sources and transmit all four samples. Consequently, the samples in the multiplexed sequence 28 are separated by 31.25 $\mu$s, for an effective sample rate of 32 KHz.

The multiplexed sample sequence 28 is typically buffered by a high-speed amplifier, which drives the impedance of the wire, cable, transmission line 16, etc. used to convey the sequence to the desired remote destination. At the destination, another amplifier receives the signal from the transmission line 16 and conditions (filtering, glitch suppression, etc.) it before presenting it to the input of a de-multiplexer 20. The de-multiplexer 20 reverses the operations performed by multiplexer 12, to extract the original four sample sequences 26 from the multiplexed sequence 28. Each of the resulting sample sequences may then be acted upon by a digital-to-analog (D/A) converter 22A–D to reconstruct the respective voice signals 30.

In the preceding example, only four signals were multiplexed. However, the TDM principle can clearly be extended to transmit greater numbers of voice signals over a single line. In fact, the upper limit on the number of voice channels that can be carried is related to the amount of available bandwidth, commonly stated in terms of the maximum bits per second (bps) sustainable by the hardware. Along with the number of signal sources (or, channels) and the sample rate, the bandwidth required for a TDM transmission depends on the number of bits per sample. For voice communications, signals are usually digitized to 8 bits. Thus, the bandwidth required can be expressed as: bandwidth (bps)=no. of channels×no. of bits per sample×sample rate. The original T-carrier system developed in the 1970's allows for 24 voice channels to be multiplexed onto a single line, using the techniques described above. If each channel is sampled with 8-bit resolution at a rate of 8 KHz, the TDM bandwidth required is: 24×8×8000=1.536 Mbps. The original T1 standard defines a data structure known as a D4 frame for the transport of TDM data. A D4 frame consists of 24 consecutive 8-bit samples (one from each voice channel), preceded by a framing bit. Note that the addition of the framing bit alters the previous TDM bandwidth calculation. Since each frame consists of 24×8+1=193 bits, and frames are transmitted at 8000 frames per second, the bandwidth becomes: (24×8+1)×8000=1.544 Mbps. The framing bit follows a special pattern called the frame alignment signal, which repeats every 12 frames. The group of 12 consecutive frames bounded by this frame alignment signal is known as a superframe.

T1 performance is easily achieved with today's technology, and the demand for greater bandwidth soon led to the introduction of other standards, embodied in the following digital signal hierarchy (DSH):

| DS Level | North American Bandwidth | Voice Channels | T-Carrier |
| --- | --- | --- | --- |
| DS0 | 64 Kbps | 1 | |
| DS1 | 1.544 Mbps | 24 | T1 |
| DS2 | 6.312 Mbps | 96 | |
| DS3 | 44.736 Mbps | 672 | T-3 |

Thus, for example, a single T-3 line supports 672 DS0 voice channels.

As described above, voice signals are typically encoded using time division multiplexing (TDM) for transmission over the telephone network. However, there is an undesirable characteristic of TDM, which potentially reduces its efficiency. Under TDM, the mapping of time slots to voice channels within a frame is fixed. Consequently, a time slot allotted for a particular voice channel may go unused, if the signal source for that channel is inactive during its time slot. This typically occurs with "bursty" signals, which consist of active signal intervals separated by periods of inactivity. Significantly, normal speech is a bursty signal. With such signals, the frame may be transmitted with less than its full capacity, since many of its timeslots may contain samples collected during a period of inactivity. An approach that overcomes this limitation is asynchronous transfer mode (ATM). Asynchronous transfer mode (ATM) is a switching technology that organizes digital data into 53-byte cells for transmission over a physical medium. Each cell consists of 1 5-byte header and a 48-byte payload, containing the actual data to be transmitted. Individually, a cell is processed asynchronously relative to other related cells and is queued before being multiplexed over the transmission path. ATM presents the cells (containing the voice samples) to the network whenever there is enough bandwidth available to handle them. In this sense, the voice data transfer is asynchronous relative to the generation of the original voice signal. In addition to voice, ATM supports various other types of signals and data, including video and multimedia applications. In an ATM network, data must be divided into cells before transmission and reconstituted from cells upon reception. This is known as segmentation and reassembly (SAR), and is typically handled by a hardware device (i.e., electronic circuitry).

Note that a T1 connection directly routes frames from a source to designated destination. In contrast, ATM allows flexibility in the choice of a connection path. The 5-byte header within each 53-byte ATM cell contains a virtual path identifier (VPI) and virtual channel identifier (VCI). The VPI and VCI are used to route the cell to its intended destination. This allows the ATM switching hardware to efficiently allocate connection paths based on the level of activity in the voice channels. Because the cells are always the same size, dedicated hardware designs for high-performance ATM switches are relatively straightforward. As a result, ATM networks can operate at speeds greater than 155 Mbps.

Voice data formatted as ATM cells can be transmitted over a T1 connection by using a network adaptor. The network adaptor converts the 53-byte ATM cells into a sequence of samples, which are assigned to the timeslots within three frames (since each frame contains 24 bytes of data, the 53 cells must be spread over three frames). This process can also be reversed to generate ATM cells from T1 frames. The conversion between ATM and T1 data formats can be employed to efficiently route voice traffic through the telephone network.

Within the telephone system network, a central office (CO) is an office local to a group of subscribers (i.e., telephone system users). Home and business lines are connected to a CO by what is called a local loop. The local loop connection is usually on a pair of copper wires called twisted pair. The voice signals from each subscriber are typically in analog form (i.e., continuous) over the local loop, but are transformed into digital data at the CO. The CO also has switching equipment that can switch calls locally or to long-distance carrier phone offices. The conversion from T1 to ATM is useful for combining a large number of voice channels to be transmitted over a long distance by a high-bandwidth link (such as optical fiber) connecting one central office to another within the telephone network.

Normal voice communications is connection-oriented. That is, a connection between the talker and the listener must be established before voice data is transmitted. In contrast, data communication networks, such as the Internet, or a local area network (LAN) in an office, are inherently connectionless. The model for such networks is that of a single communications line, shared by several nodes. Connectionless network service does not predetermine the path from the source to the destination system. Messages are sent out on the shared line in the form of packets (also known as datagrams). Each packet is directed to a particular node through the inclusion of the recipient's address in header information associated with the message. The header precedes the portion of the packet containing the data being transmitted (i.e., the payload). Packets must be completely addressed because different paths through the network might be selected (by routers) for different packets, based on a variety of influences. Each packet is transmitted independently by the source system and is handled independently by intermediate network devices. The connectionless mode of operation is more appropriate for many types of data communication. For example, when sending an email message out over the Internet, it would be inconvenient to require the intended recipient of the email to have previously established a connection channel through which to receive the email.

Voice data may be formatted to allow transmission over a connectionless network by segmenting the data into appropriate-sized frames, prefixed with the required header information. This conversion is termed data encapsulation. Data encapsulation could be necessary, for example, at the interface between the public switched telephone network (PSTN) and an optical fiber-based LAN. The Transmission Control Protocol/Internet Protocol (TCP/IP) suite, described below, may be used for the encapsulation and delivery of voice data over a connectionless network. The function of the various protocols in the TCP/IP suite may be understood with reference to the following open systems interconnect (OSI) 7-layer model.

| (7) APPLICATION LAYER | (6) PRESENTATION LAYER | (5) SESSION LAYER | (4) TRANSPORT LAYER | (3) NETWORK LAYER | (2) DATA LINK LAYER | (1) PHYSICAL LAYER |
|---|---|---|---|---|---|---|
| Email<br>File Transfer<br>Web Applications<br>RTP | HTTP<br>FTP<br>Telnet | POP3<br>IMAP | TCP<br>UDP | IP<br>ATM | Ethernet<br>SLIP<br>MAC | ADSL<br>coaxial cable |

In the OSI model, the process of communication between two computers connected by a telecommunication network is divided into layers (also described as a stack). When a message is transmitted from one computer to the other it passes down through the various layers on the sender's side of the network, and back up through the protocol layers when it is received at the receiver's side.

(1) The Physical Layer is the lowest level of the OSI model, and the protocols here define actual physical medium for the transport of a bit stream from one point in the network to another.

(2) The Data-Link Layer defines the access strategy for the physical medium, and pertains to hardware devices such as network interface cards (NICs), routers and bridges.

(3) The Network Layer governs the routing and forwarding of data through the network.

(4) The Transport Layer provides error-checking and ensures that all the data sent have been received at the destination.

(5) The Session Layer coordinates exchanges between two computers over the network to ensure that the connection is preserved until the transaction is completed.

(6) The Presentation Layer, usually part of an operating system, is the point at which data sent is rendered into a format usable by the recipient—e.g., transformation of a byte stream into a displayable image.

(7) The Application Layer is the layer at which network-oriented applications programs reside—these applications are the ultimate target of the message transmitted by the sender.

The IP is a Layer 3 protocol, most familiar as the protocol by which data is sent from one computer to another on the Internet. Each computer (known as a host) on the Internet has at least one IP address that uniquely identifies it from all other computers on the Internet. When data is sent or received (for example, an e-mail note or a Web page), the message gets divided into packets, each of which contains both the sender's and the receiver's Internet address. Packets are first sent to a gateway computer that directly accesses a small neighborhood of Internet addresses. If the destination address is not directly accessible to the gateway computer, it forwards the packet to an adjacent gateway. This process continues until one gateway recognizes the packet as belonging to a computer within its immediate neighborhood or domain. That gateway then delivers the packet directly to the computer whose Internet address is specified.

IP is a connectionless protocol, which means that there is no continuing connection between the end points that are communicating. Each packet that travels through the Internet is treated as an independent unit of data without any relation to any other unit of data. Consequently, the packets comprising a message may take different routes across the Internet. Furthermore, packets can arrive in a different order than that in which they were sent. The IP accounts for their delivery to the correct recipient, but does not manage the delivery sequence. In the context of the Internet, the Layer 4 Transmission Control Protocol (TCP) is generally relied upon to arrange the packets in the right order, and the two protocols are often jointly referred to as TCP/IP. An alternative to TCP (also at Layer 4) is the User Datagram Protocol (UDP), which offers a limited amount of service when messages are exchanged between computers in an IP-based network. Like TCP, UDP uses the IP to actually get a packet from one computer to another. Unlike TCP, however, UDP does not provide the service of dividing a message into packets and reassembling it at the other end. However, UDP does provide port numbers to help distinguish different user requests and, optionally, checksum capability to verify that the data arrived intact. UDP is used by applications that do not require the level of service of TCP or that wish to use communications services not available from TCP Realtime transport protocol (RTP) is an IP-based protocol providing support for the transport of real-time data such as video and audio streams. A Layer 4 protocol, RTP provides time-stamping, sequence numbering and other mechanisms related to managing timing issues in such data. The sender creates a timestamp when the first voice signal sample in a packet is collected, and this timestamp is then attached to the data packet before sending it out. The receiver may use this information to assemble the packets in their correct sequence, or to synchronize one packetized data stream with another—for example, in the case of transmitted audio and video data from a movie. RTP also provides other services, such as source identification. Using the source identifier in the RTP header of an audio packet exchanged during a video conference, for example, a user can identify who is speaking.

Information required by each protocol is contained in a header attached to a data packet as it makes its way through the network. Header information associated with the protocols at different OSI layers can be nested. For example, data sent from an application may begin as an RTP packet:

As the packet moves down through the OSI layers to be transmitted over the physical medium, a UDP header is prepended, followed by an IP header:

It is often necessary to transform voice from the connection-oriented frame-based TDM format used by the PSTN to a connectionless cell-based format, such as that used by ATM, or a packetized format such as used by an Ethernet network. A significant effort in such transformations is devoted to the preparation and attachment of header information to the data.

Because of the various formats in which voice data may be transmitted and received, the central offices and other nodes within the telephone network are equipped with extensive electronic circuitry to translate and reroute the myriad types of voice signals. Because of the specialized nature of these functions, they are typically performed independently by discrete rack-mount circuit cards and modules. The consumption of power and space attributable to this aggregation of electronic devices is a serious problem. Excessive heat generation and its impact on system reliability, are a related concern.

In view of these problems, it would be desirable to have a system capable of efficiently translating between the major protocols for voice signals, which could be easily incorporated as a functional module within an integrated circuit. This system should be capable of segmenting data and providing headers to allow translation between frame-based data formats (such as TDM frames) and packet-based or cell-based data formats (such as RTP packets or ATM cells). In an integrated circuit implementation, the system should be capable of performing these functions without relying on an external processor.

SUMMARY OF THE INVENTION

The problems outlined above are addressed by a system and method for reformatting voice telephony signals and for efficiently implementing a protocol stack in an integrated circuit. An embodiment of the system and method is disclosed herein, in which the creation and management of a protocol stack is illustrated in the context of an exemplary integrated circuit voice processor. In addition to standard signal processing functions, such as dynamic range compression/expansion and echo canceling, the voice processor supports the conversion between cell-based or packet-based data and traditional frame-based telephony data. The voice processor employs the present system and method, according to which a DMA-based protocol stack and independent processor create and manage cell or packet headers. Thus, protocol processing and error detection have minimal impact on concurrent signal processing operations.

In an embodiment of the system disclosed herein, voice data is transferred and reformatted efficiently through the use of a linked list of data structures, consisting of buffer management descriptors (BMDs) and associated memory buffers. Each BMD contains a pointer to its respective memory buffer, which contains a portion of the data corresponding to a particular voice channel, as well as a pointer to the next BMD in the liked list. The sequence of pointers allow the data structures to be easily navigated by indexed direct memory access (DMA) controllers. The DMA controllers are thus able to perform data transfers without the involvement of the signal processing engines in the voice processor. Advantageously, this allows the movement of data to be accomplished without adversely affecting signal processing.

A dedicated packet control processor (PCP) configures the linked list of data structures, and maintains a header template for each of the active voice channels. The header template conforms to a standard protocol stack. For example, if data is being prepared for transmission as packets over an Ethernet connection, a TCP/IP header is prepared by the PCP, and prefixed to the linked list of data structures prior to transmitting the data. When a packet has been completed, a DMA controller in the network port of the voice processor transmits the data, traversing the linked data structures as described above. As before, this process is performed independently of the signal processing activities.

A method for encapsulating voice telephony signals, involving reformatting voice data and implementing a protocol stack, is also disclosed herein. The method calls for the creation of a linked list of data structures and a set of header templates. Each data structure in the linked list contains a BMD and an associated memory buffer, and each BMD points to its memory buffer and to the next BMD in the list. The pointers in the BMDs allow a DMA controller to access the data contained in the memory buffers, and transfer it to another location without assistance from a DSP. This is beneficial, since it avoids interfering with the signal processing activities of the DSPs. An independent processor (the PCP) coordinates the movement of voice data by the DMA controller, so that data transferred to a new location are suitably arranged for transmission in a prescribed format. For example, after processing by a DSP, voice data samples received over a TDM connection can be transferred from DSP memory to a memory buffer associated with the PCP, and regrouped in the form of a TCP/IP packet payload.

The method also calls for the PCP to create a packet header, by modifying fields within a template conforming to the prescribed network protocols. The PCP prefixes this header to a linked list of data structures containing the data to be transmitted over the network, and a DMA controller transmits the data by traversing pointers in the data structures.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Telephone voice signals originate in analog form, but travel relatively short distances before being converted to digital format, for transmission across high-bandwidth networks. To maximize the use of transmission media, such as wire, coaxial cable and fiber optic, multiple digitized voice signals are time division multiplexed (TDM) onto a single line. Throughout the telephone network, gateway sites manage this communications activity, providing signal processing, switching, protocol translation, etc. Given the high volume of voice data traffic, a great deal of circuitry is required to perform these operations. Therefore, the power efficiency and space utilization of the associated circuitry are highly important issues.

The transmission of digitized voice signals over a network requires that the voice data be formatted into discrete packets, prefixed with a header conforming to the network protocols. Preparation of the voice data in this manner is referred to as "encapsulation." A system and method for efficient encapsulation of voice signals, suitable for implementation within an integrated circuit, is disclosed herein. An exemplary embodiment of the system and method is presented, in the context of a voice processor IC.

The voice processor is capable of translating and rerouting voice signals in various formats. The voice processor also includes on-chip digital signal processors (DSPs) to perform echo cancellation, adaptive differential pulse code modulation (ADPCM), and other signal processing functions on voice data. In conventional voice-to-network ICs, header creation and management of the protocol stack are typically carried out by the DSP(s), which impairs signal processing throughput. Advantageously, the system and method disclosed herein do not utilize the DSP for voice data encapsulation.

Figure 2:
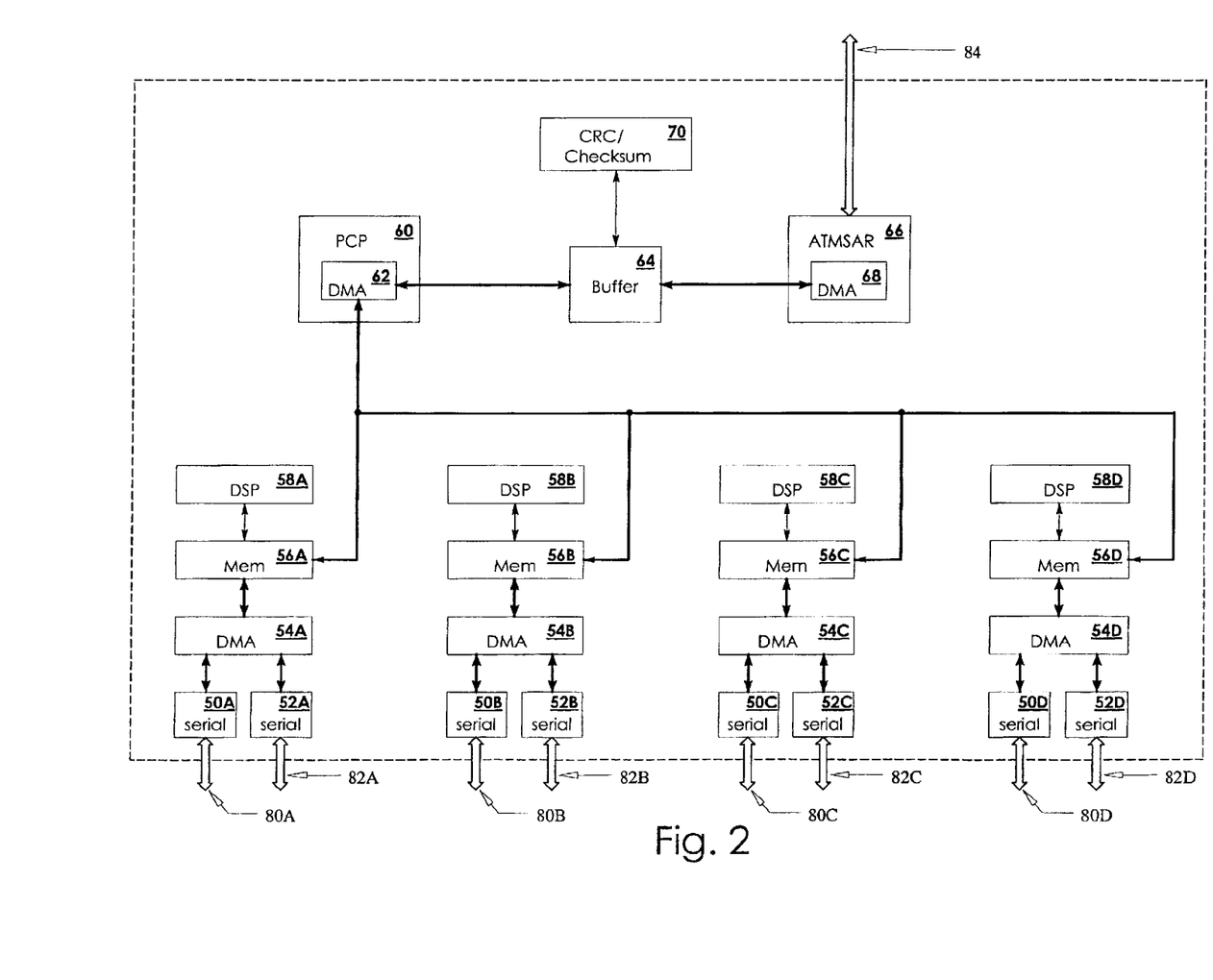
FIG. 2 contains a block diagram of a voice processor embodying the system and method for protocol stack encapsulation disclosed herein.

FIG. 2 contains a simplified block diagram of an embodiment of the voice processor, which will be referred to in discussing the present system and method for voice data encapsulation. The major components and signal paths within the processor, enclosed within the dashed line in FIG. 2, are present on a single semiconductor substrate. Signals to/from the outside world are represented as broad arrows, and the solid heavy arrows represent (direct memory access) DMA data paths. The processor has two major signal input/output paths. The first is a set of 8 bi-directional serial data connections 80A–D and 82A–D, over which frame-based data is exchanged between the processor and a TDM port, such as a T1 backplane. The second is the ATM segmentation and reassembly (ATMSAR) port 84, over which packetized or cell-based data is exchanged between the processor and a connectionless network, such as Ethernet. For simplicity, the diagram in FIG. 2 does not show a host processor interface port, through which an external processor can take control of voice processor internal functions.

In the present embodiment, the voice processor contains four DSPs, 58A–D, which operate independently of one another. Each DSP has its own 48K×16-bit memory 56A–D. The 8 serial ports 80A–D and 82A–D receive and transmit TDM-format data (e.g., from a framer), and (in each direction) comprise three signals—data, sync and clock. A pair of serial ports 80A–D and 82A–D is associated with each of the DSPs 58A–D. The memory 56A–D associated with the DSPs 58A–D is accessible by both the DSP and the associated DMA controller 54A–D, and can service two or more read or write requests simultaneously. To accomplish this, each of the data memories 64A–64D is segmented—i.e., subdivided into quasi-independent sections. As long as simultaneous memory accesses are not made to the same segment (referred to as a collision), the memory can be shared. This use of segmented memory, together with the DMA controller, enhances data throughput. For example, serial port 50B associated with DSP 58B can use the DMA controller 54B to directly transfer incoming voice data into the memory 56B of the DSP, while the DSP simultaneously processes data in another segment of memory 56B. The DMA transfer can occur much faster than if it were necessary to rely on the DSP itself to move the data from the serial port to the memory. Furthermore, the DMA-mediated transfer does not impede the data processing efforts of the DSP.

A packet control processor (PCP) 60 is also included in the present embodiment of the voice processor. This device is a general purpose microprocessor with a reduced instruction set computer (RISC) architecture. Supporting the PCP 60, are a 32K×32-bit buffer memory 64 and a (cyclic redundancy check) CRC checksum engine 70. The PCP 60 serves a number of functions in the voice processor.

The voice processor must seamlessly convert voice signals from the standard frame format used in telephony to a packetized form used in network communications (e.g., the Internet). Voice data is received through the serial ports 50A–D and 52A–D in the form of frames. The PCP 60 reformats this data as packets or cells (conversion to cells requires some additional processing by the ATMSAR 66) before it is sent out the ATMSAR port 84 onto a network. The process by which voice data is prepared for transmission over a network is referred to as encapsulation, and is accomplished by the PCP using data structures in the buffer memory 64, as described in detail below.

Each packet or cell of data to go out over the network must have a specific header attached. One of the principal responsibilities of the PCP is the management of a protocol stack for the creation of these headers. As described earlier, data packets contain a header compounded from information associated with the protocols at different OSI layers. When data received through the serial ports 50A–D and 52A–D is prepared for transmission out of ATMSAR port 84 onto a network, the data must be reorganized as packets or cells, and the appropriate header attached to each packet or cell. The PCP 60 builds this header according to the selected output data format (as described in detail below), and prefixes it to outgoing packets. If the data is being ported to an ATM network, ATMSAR 66 reformats the packetized data as ATM cells before transmitting it. This process is reversed when packetized data received into ATMSAR port 84 is transmitted in frame-based format to a TDM port, using serial ports 80A–D and 82A–D. In this case, the PCP 60 strips the headers from the incoming data and reorganizes the data as frames, before transmitting it out the serial ports.

The PCP 60 contains its own DMA controller 62, with which it can access the segmented DSP memories 56A–D. The PCP is thus able to transfer data between the DSP memories and buffer memory 64. Like the DSP memories, buffer memory 64 allows multi-port access by the PCP 60, the CRC/checksum engine 70 and the ATMSAR 66.

A further important function of the PCP 60 is the distribution of incoming data among the DSPs according to their relative workload. The time slots in an incoming TDM frame of data are equivalent to individual voice channels, and each DSP is assigned certain channels to process. A time slot interchange (TSI) circuit controlled by the PCP (omitted from FIG. 2 for simplicity) allows data from each time slot in an incoming TDM frame to be directed to any of the serial ports 80A–D and 82A–D, and thus to the associated DSP. The PCP uses the TSI to assign channels to DSPs, distributing the processing effort equally among the DSPs to optimize data throughput.

In a conventional voice processing IC, encapsulation is typically performed by the DSP. This requires the DSP to first packetize the data, according to the relevant network protocols. The DSP must then create a header for each packet and attach it to the packet before it can be transmitted over the network. Unfortunately, these operations divert the DSP from whatever signal processing tasks it may be performing, and adversely affect data throughput. However, the headers required for the major protocol layers have a fixed format, in which relatively few of the header fields vary from one packet to another. As a result, packet headers can be readily derived from a prepared template, with the variable fields edited as necessary.

Figure 3:
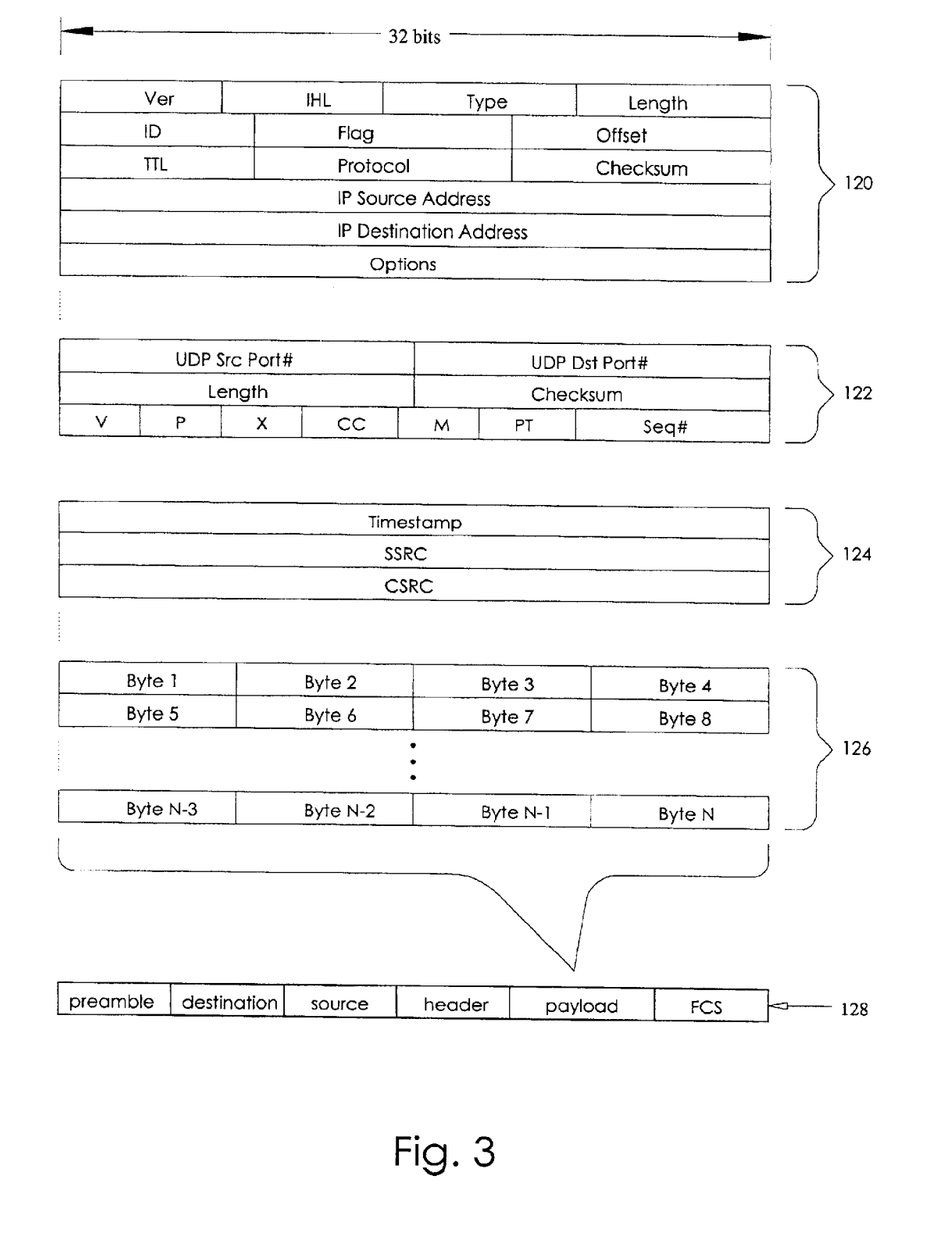
FIG. 3 represents packet headers corresponding to a TCP/IP protocol stack.

FIG. 3 illustrates a composite header for the TCP/IP protocol stack. Each item in FIG. 3 represents a header for a particular protocol layer and are numbered in the sequence in which they would arrive in an incoming (e.g., Ethernet) data stream. The protocol layers corresponding to these headers were discussed earlier, so a detailed discussion will not be undertaken here. The top-most protocol layer in the stack represented in FIG. 3 is the IP layer, for which the header 120 is at least 20 bytes long and contains (among other information) the IP source and address for the packet. Following the IP header in the data stream is the header 122 for the UDP layer, which is 12 bytes long and includes a checksum value for the packet payload. Beneath the UDP layer in the protocol stack is the RTP layer, and its 12-byte header 124 appears next in the data stream. The RTP header contains a timestamp for the first voice signal sample in a packet. Following the RTP header is the payload 126 of the packet, a variable length sequence. The composite RTP/UDP/IP header and payload are encapsulated within a media access control (MAC) header 128, comprising the payload portion of a RTP/UDP/IP/MAC datagram. The source and destination within a MAC header typically refer to the unique hardware address of a particular computer on a network. Similarly to packets, ATM cells also require a 5-byte header. However, ATM cells are always the same length, and the last cell in a group of cells is denoted by a special header.

Fortunately, the size and format of the headers shown in FIG. 3 never changes, and only certain fields within the headers need to be modified from one packet to another. For example, the actual size of the packet payload is specified in the $4^{th}$ byte of the IP header 120; therefore, this field would have to updated on a per-packet basis. This characteristic of the headers is exploited to simplify management of the protocol stack in the voice processor.

In an embodiment of the system and method disclosed herein, the transfer of frame-based data into or out of the DSP data memory is facilitated by the use of indexed DMA controllers, which target prescribed regions within the DSP memory (items 56A–D in FIG. 2). As mentioned above, the DSP memory supports multi-port access, so reads and writes can occur to two non-overlapping segments simultaneously. Data is managed within the DSP memories, transferred to the PCP buffer memory (item 64 in FIG. 2) and reorganized as packets, through the use of a linked list of buffer management descriptors (BMDs).

Figure 4:
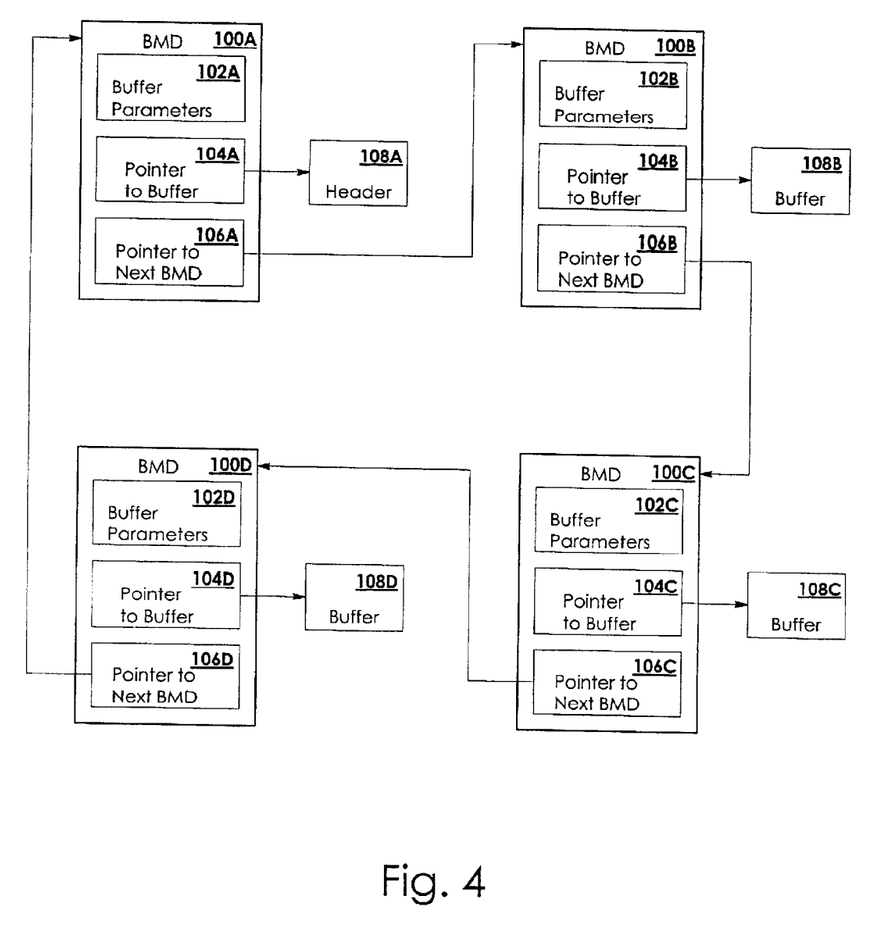
FIG. 4 illustrates the use of buffer management Descriptor (BMD) linked list data structures.

As represented in FIG. 4, a BMD 100A–D is a data structure, associated with which is a data buffer 108A–D.

Each BMD contains a pointer to its buffer region 104A–D, a set of buffer parameters 102A–D, and a pointer to the next BMD in the list 106A–D (hence, the term "linked list"). The buffer parameters include the size of the buffer, a flag indicating whether the buffer contains valid data, and CRC and checksum values used for error checking. Since the last BMD in the list points to the first, the buffer regions are organized as a ring. The memory for each DSP contains a ring of buffers for each voice channel assigned to that DSP. The buffer regions corresponding to the BMDs can be configured to accommodate from 1 ms to 40 ms of voice data. Data is transferred by an indexed DMA controller into its respective DSP memory, using a pointer to the next available buffer (i.e., the next buffer region that does not contain valid data). The size, number, etc. of the buffer regions are defined by the PCP.

Before incoming frame-based data is received (over serial ports 80A–D and 82A–D in FIG. 2), each channel is assigned a DSP and a BMD pointer mapping the data to a particular buffer region in the DSP data memory (items 56A–D in FIG. 2). The associated DMA controller (items 54A–D in FIG. 2) then transfers data directly into the designated buffer region as it is received over the serial port. When the buffer is filled, the flag in the corresponding BMD is set to indicate that the buffer contains valid data. The DMA controller then updates its BMD pointer, so as data continues to be received over the serial port, it's placed into the next buffer in the ring. In the meantime, signal processing operations, such as echo canceling, are performed by the DSP on data in the buffer regions that have been filled. After being operated on by the DSP, the data is ready to be encapsulated for transmission over the network.

To encapsulate processed data for export to a network, the data must first be transferred from the DSP memory to the PCP buffer memory (item 64 in FIG. 2). This transfer is mediated by the DMA controller (item 62 in FIG. 2) within the PCP. Note that since this is a DMA transfer from a multi-port memory, DSP execution is not impeded. When the data in a buffer has been transferred from DSP memory into the PCP buffer memory, the PCP clears the valid flag in the corresponding BMD to indicate that that buffer is available again. Within the PCP buffer memory, the data is reorganized as variable length packets and a sequence of encapsulation steps carried out, in which headers for the various levels of the operative protocol stack are added to each packet. This reorganization is carried out within the buffer memory, using a linked list of BMDs and a channel descriptor.

The voice processor can support signals from up to 128 voice channels. For each channel, there is a channel descriptor in the PCP buffer memory. The channel descriptor is a data structure that assigns the voice channel it represents to one of the DSPs. It also contains a pointer to a template for the RTP/UDP/IP/MAC packet header, and for the ATM cell and final cell headers, as well as a pointer to a BMD linked list, a flag to indicate whether the designated channel is active, and CRC/checksum information used during the construction of a packet.

Figure 5:
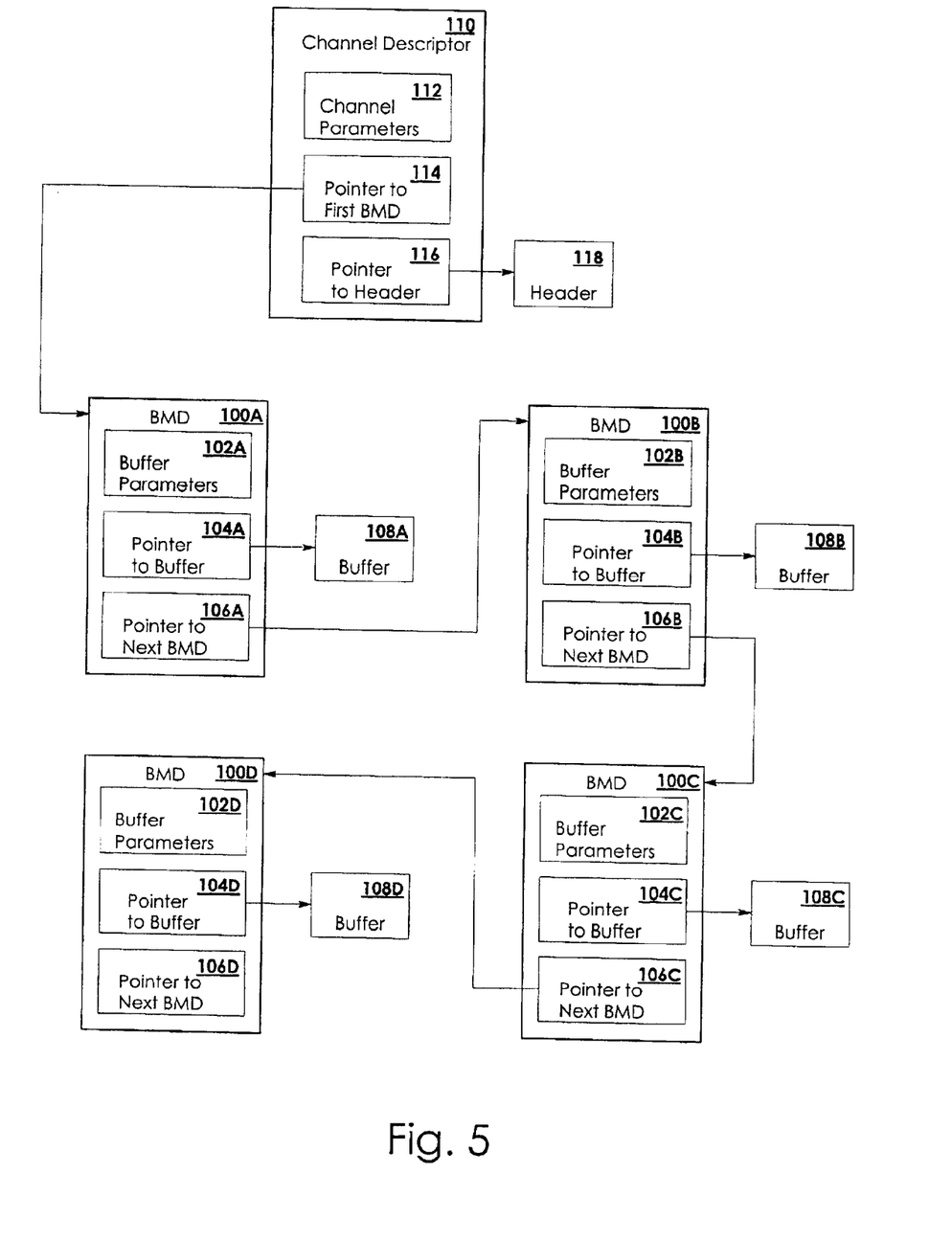
FIG. 5 illustrates the use of linked BMDs to prepare a packet for transmission over a network.

Using the information in the channel descriptor, the PCP is able to add the header (created from the template in the channel descriptor) to the data processed by the DSP and transferred into the buffer memory. The method by which this is accomplished is illustrated in FIG. 5. The BMD pointer 114 in the channel descriptor 110 is set to point to the first BMD in the linked list received from the DSP. Similarly, the header pointer 116 in the channel descriptor is set to point to the header 118 built for the processed data by the PCP. This effectively prefixes the header template to the linked list of data to be encapsulated. Using the pointers in the BMDs, the processed data can be efficiently and quickly traversed, making it a simple matter to fill in the various data-dependent fields in the default header template. The CRC/Checksum engine (item 70 in FIG. 2) in the voice processor computes cyclic redundancy and checksum values, which will be used to verify the integrity of the transmitted data.

At this point, an indexed DMA controller (item 68 in FIG. 2) in the ATMSAR (item 66 in FIG. 2) is able to transmit all of the data in the linked list out the ATMSAR port (item 84 in FIG. 2), by simply sequencing through the linked buffer pointers. The data is transmitted as an IP packet, with the size of the payload determined by the length of the linked list data sequence.

To transmit packetized data over a network, the ATMSAR is operated in transparent mode, in which it outputs the packetized data without modification. In its normal mode of operation however, the ATMSAR reformats the data in the variable-length packets created by the PCP into fixed-length ATM cells before transmitting it over a network based on the "Universal Test and Operation Physical Interface for ATM" (UTOPIA) standard. An ATM header is prefixed to every cell but the last, which requires a special header. These headers are prepared using templates, in a similar manner to the packet headers.

Packet-based or cell-based data may also be received by the voice processor over the ATMSAR port. In this case, the previously described sequence of events is reversed. Incoming ATM cells are disassembled by the ATMSAR, with the header information being used to assign payload data to TDM channels. After the CRC/checksum engine verifies cyclic redundancy and checksum values on the incoming data, the PCP moves the data into the memory of the appropriate DSP and initializes the BMD pointer, flags, etc. to enable fast DMA access of the data by the DSP. Converting incoming packet-based or cell-based data into outgoing frame-based data is more complicated than the converse, however, since the incoming packets do not arrive at a fixed rate (packetized data traffic is "bursty"). The data contained in the packets may not even arrive in the proper time sequence, and must be re-sequenced by the PCP. Scheduling issues arise due to the sporadic nature of the incoming packetized data, since the transfer of packet data from the PCP buffer memory to the memory of the appropriate DSP must occur at a time when that DSP is not too busy to receive it. The PCP schedules data transfers by delivering data from the buffer memory at a rate commensurate with the processing throughput of the DSP. Periodically, the PCP delivers data extracted from incoming packets in the form of a single block, representing 1–40 ms worth of voice data on all of the channels assigned to a given DSP. At this rate, the DSP will have completed processing the previous block by the time it receives a new one. The DSP performs echo cancellation and other signal processing operations on the data to prepare it for transmission out the TDM serial ports. Following these signal processing operations, the associated serial ports transmit frame-based TDM data, using the DMA controller to efficiently transfer the data from the DSP memory.

The use of linked list data structures together with indexed DMA controllers and an ancillary processor, as disclosed herein, constitute an efficient mechanism for frame-based to packet/cell-based (and vice-versa) data format conversion. Advantageously, all necessary transfer and reorganization of data, and management of the protocol stack are accomplished without intervention by the DSPs.

It will be appreciated by those skilled in the art having the benefit of this disclosure that this invention is believed to present a system and method for encapsulation of a protocol stack in a voice telephony processor. Further modifications and alternative embodiments of various aspects of the invention will be apparent to those skilled in the art in view of this description. Details described herein, such as the detailed structure of the BMDs and channel descriptors, or the number of DSPs, are exemplary of a particular embodiment. It is intended that the following claims be interpreted to embrace all such modifications and changes and, accordingly, the specification and drawings are to be regarded in an illustrative rather than a restrictive sense.

What is claimed is:

1. A system for reformatting data in an integrated circuit voice processor, comprising:

a first linked list of sequential data structures, wherein each data structure within the first linked list comprises a first memory buffer and a first buffer management descriptor (BMD), such that the first memory buffer is adapted to store data, and the first BMD contains a first pointer to the first memory buffer and a second pointer to the next data structure in the first linked list;

a second linked list of data structures, wherein each data structure within the second linked list comprises a second memory buffer and a second BMD, such that the second BMD contains a third pointer to the second memory buffer and a fourth pointer to the next data structure in the second linked list; and a direct memory access (DMA) controller adapted to transfer data stored in memory buffers within the first linked list of data structures into memory buffers within the second linked list of data structures by traversing the first and second pointers in the first linked list to identify the source location of the data and traversing the third and fourth pointers in the second linked list to identify the destination.

2. The system as recited in claim 1, wherein the integrated circuit voice processor contains a digital signal processor (DSP) adapted to access the data, and wherein the DMA controller transfers the data from the first to the second linked list of data structures with substantially no intervention from the DSP.

3. The system as recited in claim 1, wherein characteristics of the data structures in the second linked list, including the number of data structures, the size of the second memory buffers and the sequence of the data structures in the second linked list, differ from those of the data structures in the first linked list.

4. The system as recited in claim 3, wherein the characteristics of the data structures in the second linked list correspond to the organization of data in a time division multiplexed (TDM) frame, as typically used for telephone communication.

5. The system as recited in claim 3, wherein the characteristics of the data structures in the second linked list correspond to the organization of data in a TCP/IP packet, as typically used in network communications.

6. The system as recited in claim 3, wherein the integrated circuit voice processor contains a packet control processor (PCP), adapted to configure the characteristics of the data structures in the first and second linked lists.

7. The system as recited in claim 6, wherein the PCP is further adapted to prepare a header by modifying selected fields in a template corresponding to standard network protocols from the data contained in the memory buffers in the second linked list of data structures.

8. The system as recited in claim 7, wherein the PCP is further adapted to prefix a data structure to the second linked list, such that the data structure contains a first pointer to the header and a second pointer to the first data structure in the second linked list.

9. The system as recited in claim 8, further comprising an asynchronous transfer mode segmentation and reassembly (ATMSAR) module, adapted to receive the data stored in the memory buffers of the data structures in the second linked list and reformat said data as ATM cells.

10. A method for reformatting data in an integrated circuit voice processor, comprising:
   creating a first linked list of sequential data structures, wherein each data structure comprises a first memory buffer adapted to store a portion of the data and a first buffer management descriptor (BMD) that contains a first pointer to the first memory buffer and a second pointer to the next data structure in the linked list;
   storing a portion of the data in the first memory buffer;
   creating a second linked list of data structures, wherein each data structure within the second linked list comprises a second memory buffer and a second BMD, such that the second BMD contains a third pointer to the second memory buffer and a fourth pointer to the next data structure in the second liked list; and
   transferring data stored in memory buffers within the first liked list of data structures into memory buffers within the second linked list of data structures by traversing the first and second pointers in the first linked list to identify the source location of the data and traversing the third and fourth pointers in the second linked list to identify the destination.

11. The method as recited in claim 10, wherein the wherein the integrated circuit voice processor further comprises a digital signal processor (DSP) and a direct memory access (DMA) controller, and wherein the method further comprises using the DMA controller to transfer the data from the first to the second linked list of data structures with substantially no intervention from the DSP.

12. The method as recited in claim 10, further comprising using a packet control processor (PCP) to configure characteristics of the data structures in the first and second linked lists, including their number, the size of their memory buffers and their sequence in the linked list.

13. The method as recited in claim 12, further comprising configuring the characteristics of the data structures in one of the linked lists to correspond to the organization of data in a time division multiplexed (TDM) frame, as typically used for telephone communication, and configuring the characteristics of the data structures in the other linked list to correspond to the organization of data in a TCP/IP packet, as typically used in network communications.

14. The method as recited in claim 13, further comprising the PCP preparing a header by modifying selected fields in a template corresponding to standard network protocols, from the data contained in the memory buffers in the second linked list of data structures.

15. The method as recited in claim 14, further comprising the PCP prefixing a data structure to the second linked list, such that the data structure contains a first pointer to the header and a second pointer to the first data structure in the second linked list.

16. The method as recited in claim 15, further comprising receiving the data stored within the memory buffers in the second linked list of data structures and reformatting it as ATM cells, using an asynchronous transfer mode segmentation and reassembly (ATMSAR) module.

* * * * *